United States Patent [19]

Evans

[11] Patent Number: 4,657,989

[45] Date of Patent: Apr. 14, 1987

[54] METHOD FOR PREPARING SILOXANE-CARBONATE BLOCK COPOLYMERS

[75] Inventor: Thomas L. Evans, Clifton Park, N.Y.

[73] Assignee: General Electric Company, Schenectady, N.Y.

[21] Appl. No.: 743,446

[22] Filed: Jun. 11, 1985

[51] Int. Cl.[4] .................. C08G 77/42; C08G 63/62
[52] U.S. Cl. .................................. 525/464; 525/474; 528/25; 528/29
[58] Field of Search ............... 525/464, 474; 528/25, 528/29

[56] References Cited

U.S. PATENT DOCUMENTS

| | | | |
|---|---|---|---|
| 3,051,684 | 8/1962 | Morton et al. | 525/106 |
| 3,189,662 | 6/1965 | Vaughn | 525/474 |
| 3,379,790 | 4/1968 | Krauss et al. | 525/464 |
| 3,419,634 | 12/1968 | Vaughn | 525/474 |
| 3,819,744 | 6/1974 | Buchner et al. | 525/464 |
| 4,080,400 | 3/1978 | Martin | 525/106 |
| 4,102,940 | 7/1978 | Thom et al. | 525/464 |

FOREIGN PATENT DOCUMENTS 449078  4/1975  U.S.S.R. ............................. 528/29

OTHER PUBLICATIONS

"Microdomains in Alternating Block Polymers of Dimethylsiloxane and Bisphenol-A Carbonate", *Polymer Letters*, vol. 7, pp. 573-577 (1969).

Primary Examiner—Wilbert J. Briggs, Sr.
Attorney, Agent, or Firm—William H. Pittman; James C. Davis, Jr.; James Magee, Jr.

[57] ABSTRACT

Siloxane-carbonate block copolymers are prepared by reacting (A) at least one siloxane compound with (B) at least one polycarbonate compound, one of reagents A and B being anionic and the other being reactive with nucleophiles. The siloxane compound is preferably a linear chlorosilane-terminated polysiloxane, a cyclic polysiloxane or a "living" polysiloxane anion. The polycarbonate composition may be a cyclic polycarbonate oligomer composition, preferably an oligomer mixture, or may be prepared by the reaction of such an oligomer composition with a polycarbonate formation catalyst such as tetramethylammonium tetraphenylborate.

13 Claims, 7 Drawing Figures (I) 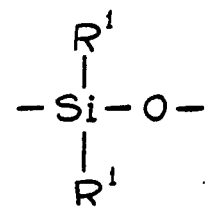
(II) 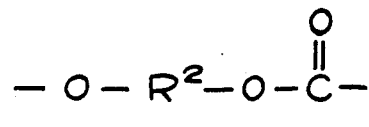
(III) 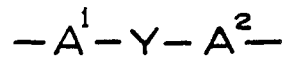
(IV) 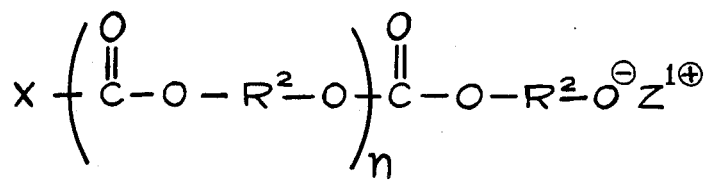
(V) 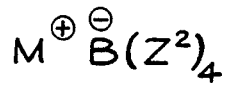
(VI) 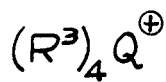
(VII) 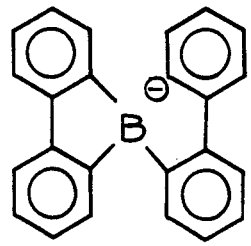

METHOD FOR PREPARING SILOXANE-CARBONATE BLOCK COPOLYMERS

This invention relates to siloxane-carbonate block copolymers and a method for their preparation.

Block copolymers containing polysiloxane and polycarbonate moieties are known in the art. Reference is made, for example, to U.S. Pat. Nos. 3,189,662 and 3,419,634, the disclosures of which are incorporated by reference herein. Illustrative uses for such block copolymers are as insulating coatings, fibers, films, composite ingredients, protective coatings for resinous articles and elastomeric ingredients for adhesives.

The block copolymers have been conventionally prepared by reacting a bisphenol with a carbonate source such as phosgene or a diaryl carbonate in the presence of a polysiloxane containing reactive end groups, typically halogen atoms. Interest continues, however, in preparing such block copolymers by new methods, particularly those readily practiced and utilizing highly reactive intermediate species.

A principal object of the present invention, therefore, is to provide a new method for preparing siloxane-carbonate block copolymers.

A further object is to provide an easily practiced method for such preparation involving the use of highly reactive starting materials and/or intermediates.

Other objects will in part be obvious and will in part appear hereinafter.

In accordance with the present invention, siloxane-carbonate block copolymers are prepared by a method which comprises reacting (A) at least one siloxane compound with (B) at least one polycarbonate compound, one of reagents A and B being anionic and the other being reactive with nucleophiles.

The invention is based in large part on the discovery of a high potential degree of interreactivity between molecular species originating in cyclic polycarbonates and those originating in various siloxanes. The requirements for such interreactivity are that one of said species be strongly reactive with nucleophiles such as alkoxide or siloxide anions, and that the other species be converted to such a nucleophile. The products of such reaction are the desired siloxane-carbonate block copolymers.

Reference is now made to the drawings which are chemical formulas for various chemical compounds and moieties relevant to the invention. These formulas are identified by Roman numerals hereinafter.

Reagent A in the method of this invention is at least one siloxane compound. It generally comprises at least one structural unit, preferably a plurality of units, of formula I in the drawings, wherein each $R^1$ is independently a hydrocarbon or substituted hydrocarbon radical. The hydrocarbon radicals may be aliphatic, alicyclic or aromatic or combinations thereof; examples are lower alkyl radicals (i.e., alkyl radicals containing up to 7 carbon atoms), phenyl radicals and cyclohexyl radicals. All $R^1$ radicals are most often identical and are usually methyl or phenyl and preferably methyl, but the invention also contemplates materials such as block polysiloxanes in which the $R^1$ values differ from block to block.

One or more of the $R^1$ values may also be substituted hydrocarbon radicals, with the proviso that any substituents present do not interfere with the method of this invention. Illustrative substituents are fluoro, alkoxy, keto and ester groups. However, it is generally preferred for each $R^1$ to be a hydrocarbon radical.

In a first embodiment of the invention, reagent A is at least one "living" polysiloxane anion. Such anions may be produced by conventional methods examplified by the reaction of a cyclic polysiloxane with a nucleophilic reagent such as an alkali metal siloxanolate, preferably in the presence of a catalytic amount of a promoter such as dimethyl sulfoxide.

In a second embodiment, reagent A is the nucleophile-reactive species. This is generally achieved in one of two ways. The first way is to use a linear siloxane containing end groups which function as anionic leaving groups. These are typically halogen atoms, particularly chlorine. For the most part, they should be bound directly to silicon, although it is also possible to employ siloxane compounds containing, for example, chloroalkyl end groups.

The second way is to employ a cyclic polysiloxane as reagent A. Octamethyltetrasiloxane is conveniently used for this purpose because of its reactivity and commercial availability.

Reagent B is at least one polycarbonate compound. It generally comprises structural units of formula II, wherein each $R^2$ is independently a divalent aliphatic, alicyclic or aromatic radical.

In formula II, the $R^2$ values may be different but are usually the same, and may be aliphatic, alicyclic, aromatic or mixed; those which are aliphatic or alicyclic generally contain up to about 8 carbon atoms. Suitable $R^2$ values include ethylene, propylene, trimethylene, tetramethylene, hexamethylene, dodecamethylene, 1,4-(2-butenylene), 1,10-(2-ethyldecylene), 1,3-cyclopentylene, 1,3-cyclohexylene, 1,4-cyclohexylene, m-phenylene, p-phenylene, 4,4'-biphenylene, 2,2-bis(4-phenylene)propane, benzene-1,4-dimethylene (which is a vinylog of the ethylene radical and has similar properties) and similar radicals such as those which correspond to the dihydroxy compounds disclosed by name or formula (generic or specific) in U.S. Pat. No. 4,217,438, the disclosure of which is incorporated by reference herein. Also included are radicals containing non-hydrocarbon moieties. These may be substituents such as chloro, nitro, alkoxy and the like, and also linking radicals such as thio, sulfoxy, sulfone, ester, amide, ether and carbonyl. Most often, however, all $R^2$ radicals are hydrocarbon radicals.

Preferably at least about 60% and more preferably at least about 80% of the total number of $R^2$ values, and most desirably all of said $R^2$ values, are aromatic. The aromatic $R^2$ radicals preferably have formula III, wherein each of $A^1$ and $A^2$ is a single-ring divalent aromatic radical and Y is a bridging in which one or two atoms separate $A^1$ from $A^2$. The free valence bonds in formula III are usually in the meta or para positions of $A^1$ and $A^2$ in relation to Y. Such $R^2$ values may be considered as being derived from bisphenols of the formula HO-$A^1$-Y-$A^2$-OH. Frequent reference to bisphenols will be made hereinafter, but it should be understood that $R^2$ values derived from suitable compounds other than bisphenols may be employed as appropriate.

In formula III, the $A^1$ and $A^2$ values may be unsubstituted phenylene or substituted derivatives thereof, illustrative substituents (one or more) being alkyl, alkenyl (e.g., crosslinkable-graftable moieties such as vinyl and allyl), halo (especially chloro and/or bromo), nitro, alkoxy and the like. Unsubstituted phenylene radicals are preferred. Both $A^1$ and $A^2$ are preferably p-phenylene, although both may be o- or m-phenylene or one o- or m-phenylene and the other p-phenylene.

The bridging radical, Y, is one in which one or two atoms, preferably one, separate $A^1$ from $A^2$. It is most often a hydrocarbon radical and particularly a saturated radical such as methylene, cyclohexylmethylene, 2-[2.2.1]-bicycloheptylmethylene, ethylene, isopropylidene, neopentylidene, cyclohexylidene, cyclopentadecylidene, cyclododecylidene or adamantylidene, especially a gem-alkylene radical. Also included, however, are unsaturated radicals and radicals which are entirely or partially composed of atoms other than carbon and hydrogen. Examples of such radicals are 2,2-dichloroethylidene, carbonyl, thio and sulfone. For reasons of availability and particular suitability for the purposes of this invention, the preferred radical of formula III is the 2,2-bis(4-phenylene)propane radical, which is derived from bisphenol A and in which Y is 2,2-propylene and $A^1$ and $A^2$ are each p-phenylene.

In the aforementioned first embodiment of the invention, reagent B is the nucleophile-reactive species. Typical of such species are cyclic polycarbonate oligomers, including dimers, trimers and tetramers of the type disclosed in the following U.S. patents:

U.S. Pat. No. 3,155,683
U.S. Pat. No. 3,274,214
U.S. Pat. No. 3,386,954
U.S. Pat. No. 3,422,119.

Also included are cyclic polycarbonate oligomer mixtures of the type disclosed in copending, commonly owned applications Ser. No. 704,122, filed Feb. 22, 1985, and Ser. No. 723,672, filed Apr. 16, 1985, now U.S. Pat. No. 4,605,731, the disclosures of which are incorporated by reference herein.

The cyclic oligomer mixtures consist essentially of oligomers having degrees of polymerization from 2 to about 30 and preferably to about 20, with a major proportion being up to about 12 and a still larger proportion up to about 15. Since they are mixtures, these compositions have relatively low melting points as compared to single compounds such as the corresponding cyclic trimer. The cyclic oligomer mixtures are generally liquid at temperatures above 300° C. and most often at temperatures above 225° C.

The oligomer mixtures useful in this invention contain very low proportions of linear oligomers. In general, no more than about 10% by weight, and most often no more than about 5%, of such linear oligomers are present. The mixtures also contain low percentages (frequently less than 30% and preferably no higher than about 20%) of polymers (linear or cyclic) having a degree of polymerization greater than about 30. Such polymers are frequently identified hereinafter as "high polymer". These properties, coupled with the relatively low melting points and viscosities of the cyclic oligomer mixtures, contribute to their utility in this invention.

These mixtures may be prepared by a condensation reaction involving bishaloformates having the formula $R^2(OCOZ^3)_2$, wherein $R^2$ is as defined hereinabove and $Z^3$ is chlorine or bromine. The condensation reaction typically takes place interfacially when a solution of said bishaloformate in a substantially non-polar organic liquid is contacted with a tertiary amine from a specific class and an aqueous alkali metal hydroxide solution.

In one method for preparing the cyclic oligomer mixture, at least one such bishaloformate is contacted with at least one oleophilic aliphatic or heterocyclic tertiary amine and an aqueous alkali metal hydroxide solution having a concentration of about 0.1–10M, said contact being effected under conditions resulting in high dilution of bishaloformate, or the equivalent thereof, in a substantially non-polar organic liquid which forms a two-phase system with water; and subsequently, the resulting cyclic oligomer mixture is separated from at least a portion of the high polymer and insoluble material present.

While the $Z^3$ values may be chlorine or bromine, the bischloroformates, in which $Z^3$ is chlorine, are most readily available and their use is therefore preferred. (Frequent reference to bischloroformates will be made hereinafter, but it should be understood that other bishaloformates may be substituted therefor as appropriate.)

The tertiary amines useful in the preparation of the cyclic polycarbonate oligomers generally comprise those which are oleophilic (i.e., which are soluble in and highly active in organic media, especially those used in the oligomer preparation method of this invention), and more particularly those which are useful for the formation of polycarbonates. Reference is made, for example, to the tertiary amines disclosed in the aforementioned U.S. Pat. No. 4,217,438 and in U.S. Pat. No. 4,368,315, the disclosure of which is also incorporated by reference herein. They include aliphatic amines such as triethylamine, tri-n-propylamine, diethyl-n-propylamine and tri-n-butylamine and highly nucleophilic heterocyclic amines such as 4-dimethylaminopyridine (which, for the purposes of this invention, contains only one active amine group). The preferred amines are those which dissolve preferentially in the organic phase of the reaction system; that is, for which the organic-aqueous partition coefficient is greater than 1. This is true because intimate contact between the amine and the bischloroformate is essential for the formation of the cyclic oligomer mixture. For the most part, such amines contain at least about 6 and preferably about 6–14 carbon atoms.

The most useful amines are trialkylamines containing no branching on the carbon atoms in the 1- and 2-positions. Especially preferred are tri-n-alkylamines in which the alkyl groups contain up to about 4 carbon atoms. Triethylamine is most preferred by reason of its particular availability, low cost, and effectiveness in the preparation of products containing low percentages of linear oligomers and high polymers.

The aqueous alkali metal hydroxide solution is most often lithium, sodium or potassium hydroxide, with sodium hydroxide being preferred because of its availability and relatively low cost. The concentration of said solution is about 0.2–10M and preferably no higher than about 3M.

The fourth essential component in the cyclic oligomer preparation method is a substantially non-polar organic liquid which forms a two-phase system with water. The identity of the liquid is not critical, provided it possesses the stated properties. Illustrative liquids are aromatic hydrocarbons such as toluene and xylene; substituted aromatic hydrocarbons such as chlorobenzene, o-dichlorobenzene and nitrobenzene; chlorinated aliphatic hydrocarbons such as chloroform and methylene chloride; and mixtures of the foregoing with ethers such as tetrahydrofuran.

To prepare the cyclic oligomer mixture according to the above-described method, the reagents and components are maintained in contact under conditions wherein the bischloroformate is present in high dilution, or equivalent conditions. Actual high dilution conditions, requiring a large proportion of organic liquid, may be employed but are usually not preferred for cost and convenience reasons. Instead, simulated high dilution conditions known to those skilled in the art may be employed. For example, in one embodiment of the method the bischloroformate or a mixture thereof with the amine is added gradually to a mixture of the other materials. It is within the scope of this embodiment to incorporate the amine in the mixture to which the bischloroformate is added, or to add it gradually, either in admixture with the amine or separately. Continuous or incremental addition of the amine is frequently preferred, whereupon the cyclic oligomer mixture is obtained in relatively pure form and in high yield.

Although addition of the bischloroformate neat (i.e., without solvents) is within the scope of this embodiment, it is frequently inconvenient because many bischloroformates are solids. Therefore, it is preferably added as a solution in a portion of the organic liquid. The proportion of organic liquid used for this purpose is not critical; about 25-75% by weight, and especially about 40-60%, is preferred.

The reaction temperature is generally in the range of about 0°-50° C. It is most often about 0°-40° C. and preferably 20°-40° C.

For maximization of the yield and purity of cyclic oligomers as opposed to high polymer and insoluble and/or interactable by-products, it is preferred to use not more than about 0.7 mole of bischloroformate per liter of organic liquid present in the reaction system, including any liquid used to dissolve said bischloroformate. Preferably, about 0.003-0.6 mole of bischloroformate is used. It should be noted that this is not a molar concentration in the organic liquid when the bischloroformate is added gradually, since it is consumed as it is added to the reaction system.

The molar proportions of the reagents constitute another important feature for yield and purity maximization. The preferred molar ratio of amine to bischloroformate is about 0.1-1.0:1 and most often about 0.2-0.6:1. The preferred molar ratio of alkali metal hydroxide to bischloroformate is about 1.5-3:1 and most often about 2-3:1.

Step II of the cyclic oligomer preparation method is the separation of the oligomer mixture from at least a portion of the high polymer and insoluble material present. When other reagents are added to the alkali metal hydroxide and the preferred conditions and material proportions are otherwise employed, the cyclic oligomer mixture (obtained as a solution in the organic liquid) typically contains less than 30% by weight and frequently less than about 20% of high polymer and insoluble material. When all of the preferred conditions are employed, the product may contain 10% or even less of such material. Depending on the intended use of the cyclic oligomer mixture, the separation step may then be unnecessary.

Therefore, a highly preferred method for preparing the cyclic oligomer mixture comprises the single step of conducting the reaction using as the amine at least one aliphatic or heterocyclic tertiary amine which, under the reaction conditions, dissolves preferentially in the organic phase of the reaction system, and gradually adding bischloroformate, amine and alkali metal hydroxide simultaneously to a substantially non-polar organic liquid or a mixture of said liquid with water, said liquid or mixture being maintained at a temperature in the range of about 0°-50° C.; the amount of bischloroformate used being up to about 0.7 mole for each liter of said organic liquid present in the reaction system, and the molar proportions of amine and alkali metal hydroxide to bischloroformate being 0.2-1.0:1 and 2-3:1, respectively; and recovering the cyclic oligomers thus formed.

As in the embodiment previously described, another portion of said liquid may serve as a solvent for the bischloroformate. Addition of each reagent is preferably continuous, but may be incremental for any or all of said reagents.

When a separation step is necessary, the unwanted impurities may be removed in the necessary amounts by conventional operations such as combining the solution with a non-solvent for said impurities. Illustrative non-solvents include ketones such as acetone and methyl isobutyl ketone and esters such as methyl acetate and ethyl acetate. Acetone is a particularly preferred non-solvent. Recovery of the cyclic oligomers normally means merely separating the same from diluent (by known methods such as vacuum evaporation) and, optionally, from high polymer and other impurities.

The preparation of cyclic oligomer mixtures useful as reagent B is illustrated by the following examples. All parts and percentages in the examples herein are by weight unless otherwise indicated. Temperatures are in degrees Celsius. Molecular weights, whenever referred to herein, are weight average unless otherwise indicated and were determined by gel permeation chromatography relative to polystyrene.

EXAMPLES 1-18

Bisphenol A bischloroformate was reacted with aqueous sodium hydroxide and triethylamine in an organic liquid (chloroform in Example 7, methylene chloride in all other examples) according to the following procedure: The bischloroformate was dissolved in half the amount of organic liquid employed and was added gradually, with slow stirring, to the balance of the reaction mixture. In Examples 1-10 and 12, the triethylamine was all originally present in the reaction vessel; in Examples 14-16, it was added gradually at the same time as the bischloroformates; and in Examples 11, 13, 17 and 18, it was added incrementally at the beginning of bischloroformate addition and at intervals of 20% during said addition. The amount of sodium hydroxide used was 2.4 moles per mole of bischloroformate. After all the bischloroformate had been added, the mixture was stirred for about 2 minutes and the reaction was quenched by the addition of a slight excess of 1M aqueous hydrochloric acid. The solution in the organic liquid was washed twice with dilute aqueous hydrochloric acid, dried by filtration through phase separation paper and evaporated under vacuum. The residue was dissolved in tetrahydrofuran and high polymers were precipitated by addition of acetone.

The reaction conditions for Examples 1-18 are listed in Table I together with the approximately percentage (by weight) of cyclic polycarbonate oligomer present in the product before high polymer precipitation. The weight average molecular weights of the cyclic oligomer mixtures were approximately 1300, corresponding to an average degree of polymerization of about 5.1.

TABLE I

| Example | Bischloroformate amt., mmole/l. org. liquid | Bischloroformate amt., total mmol. | NaOH molarity | Molar ratio, amine: bischloroformate | Temperature | Addition time, min. | % oligomer in product |
|---|---|---|---|---|---|---|---|
| 1  | 100 | 2  | 0.313 | 0.5  | 20    | 30  | 97 |
| 2  | 100 | 2  | 0.625 | 0.5  | 20    | 30  | 95 |
| 3  | 100 | 2  | 2.5   | 0.5  | 35    | 55  | 93 |
| 4  | 100 | 2  | 2.5   | 0.5  | 0     | 30  | 77 |
| 5  | 100 | 2  | 2.5   | 0.5  | 20    | 30  | 87 |
| 6  | 100 | 2  | 2.5   | 0.5  | 35    | 30  | 78 |
| 7  | 100 | 2  | 2.5   | 0.5  | 50    | 30  | 88 |
| 8  | 100 | 2  | 2.5   | 0.25 | 20    | 30  | 74 |
| 9  | 100 | 1  | 2.5   | 0.2  | 20    | 15  | 75 |
| 10 | 200 | 4  | 2.5   | 0.5  | 20    | 30  | 88 |
| 11 | 500 | 10 | 2.5   | 0.25 | 25    | 105 | 83 |
| 12 | 500 | 10 | 2.5   | 0.25 | 25    | 105 | 78 |
| 13 | 500 | 10 | 2.5   | 0.25 | 25    | 105 | 83 |
| 14 | 500 | 10 | 2.5   | 0.25 | 25    | 105 | 87 |
| 15 | 500 | 10 | 2.5   | 0.29 | 30    | 90  | 78 |
| 16 | 500 | 10 | 2.5   | 0.25 | 30    | 20  | 75 |
| 17 | 500 | 10 | 2.5   | 0.25 | 40–45 | 105 | 79 |
| 18 | 500 | 10 | 2.5   | 0.4  | 25    | 105 | 79 |

EXAMPLE 19

Bisphenol A bischloroformate (2.0 mmol.) was reacted with aqueous sodium hydroxide and 4-dimethylaminopyridine in methylene chloride. The procedure employed was that of Example 1, except that 66.67 mmol. of bisphenol A per liter of methylene chloride was employed, the aqueous sodium hydroxide concentration was 5.0M and the reaction temperature was about 25° C. The product comprised 85% cyclic oligomer.

In the second embodiment of the invention, reagent B comprises reactive anionic linear polycarbonates such as those represented by formula IV, wherein $R^2$ is as previously defined, X is a polycarbonate end group, $Z^1$ is one equivalent of a cation other than hydrogen and n is at least 1. Such materials may be prepared by contacting the aforementioned cyclic polycarbonate oligomers with a polycarbonate formation catalyst.

The polycarbonate formation catalysts include various bases and Lewis acids. Illustrative Lewis acids are dioctyltin oxide, triethanolaminetitanium isopropoxide, tetra(2-ethylhexyl) titanate and polyvalent metal (especially titanium and aluminum) chelates such as bisisopropoxytitanium bisacetylacetonate (commercially available under the trade name "Tyzor AA") and the bisisopropoxyaluminum salt of ethyl acetoacetate.

Examples of suitable bases are lithium 2,2,2-trifluoroethoxide, n-butyllithium and tetramethylammonium hydroxide. Also useful are various weakly basic salts such as sodium benzoate and lithium stearate.

A particularly preferred class of basic catalysts consists of those which generate aryl carbanions, as by the dissociation of a coordination compound containing a polyaryl-substituted anion. Such coordination compounds include those of formula V, wherein M is one equivalent of a cation other than hydrogen and $Z^2$ is an aromatic radical or two $Z^2$ values taken together form a divalent aromatic radical.

The M value may be any metal cation, with alkali metals, especially lithium, sodium and potassium, being preferred. More desirably however, it has formula VI, wherein each $R^3$ is independently a $C_{1-4}$ primary alkyl or $C_{6-10}$ aryl radical, preferably alkyl and most desirably methyl, and Q is nitrogen, phosphorus or arsenic.

The $Z^2$ values in formula V may be phenyl radicals or substituted phenyl radicals wherein the substituents may be $C_{1-4}$ alkyl, aryl, halo, nitro, $C_{1-4}$ alkoxy or the like. Any substituents are preferably electron-withdrawing groups such as halo or nitro, but unsubstituted phenyl radicals are most preferred. It is also possible for two $Z^2$ values together to form a divalent radical such as 2,2'-biphenylene.

Thus, it will be apparent to those skilled in the art that suitable catalytic species of this type include such compounds as lithium tetraphenylborate, sodium tetraphenylborate, sodium bis(2,2'-biphenylene)borate, potassium tetraphenylborate, tetramethylammonium tetraphenylborate, tetra-n-butylammonium tetraphenylborate, tetramethylphosphonium tetraphenylborate, tetra-n-butylphosphonium tetraphenylborate and tetraphenylphosphonium tetraphenylborate. As between these and similar catalysts, the choice may be dictated by such factors as the desired rate of reaction and the chemical nature of the oligomer composition being polymerized. For the preparation of aromatic anionic polycarbonate such as bisphenol A polycarbonate, the preferred catalysts are the tetra-n-alkylammonium and tetra-n-alkylphosphonium tetraphenylborates. Tetramethylammonium tetraphenylborate is particularly preferred because of its high activity, relatively low cost and ease of preparation from tetramethylammonium hydroxide and an alkali metal tetraphenylborate.

The molecular structures of the X and $Z^1$ values in reagent B will, in general, depend on those of the polycarbonate formation catalyst and are not critical for the purposes of the invention. They are included in formula IV only for the sake of depicting a complete formula for the anionic linear polycarbonate. When a catalyst of formula V is employed, $Z^1$ is identical to M. If $Z^2$ is monovalent (e.g., phenyl), its structure is identical to that of X; if it is divalent (e.g., 2,2'-biphenylene), X may have a structure of the type represented by formula VII.

Preparation of the reactive anionic linear polycarbonate is typically effected by merely contacting the cyclic oligomer composition with the catalyst at temperatures up to 350° C., usually in the range of about 200°–350° and preferably about 200°–300° C., until polymerization has proceeded to the extent desired. The reaction may be conducted in the melt or in a substantially inert diluent such as chlorobenzene, o-dichlorobenzene, dichlorotoluene, dimethylformamide or dimethyl sulfoxide.

The reaction temperature is dependent to some extent on the identity of the catalyst. One reason for the preference for quaternary ammonium and phosphonium tetraphenylborates is that they are extremely active at temperatures as low as 200° C., effecting essentially 100% conversion to catalyst in about 10-30 minutes. Sodium tetraphenylborate, on the other hand, is essentially ineffective as a catalyst at 200° C. but is effective at 250° C.

The proportion of catalyst used will depend to some extent on the molecular weight of the polycarbonate block desired and the time available for completion of the polymerization reaction. A "living" polymerization is involved, and therefore the molecular weight of the polycarbonate block will vary inversely with the proportion of catalyst used. On the other hand, the reaction rate varies directly with the proportion of catalyst. Therefore, as said proportion is increased, the time required for polymerization and the molecular weight of the polycarbonate block both decrease.

Balancing these factors, it is generally found that catalyst proportions of about 0.001-1.5 mole percent, based on carbonate units in the oligomer, are satisfactory. In the case of bisphenol A polycarbonate oligomer mixture and tetramethylammonium tetraphenylborate, a polymerization reaction conducted at 300° C. is complete in less than 5 minutes with 0.05 mole percent catalyst and in approximately 60 minutes with 0.0013 mole percent.

According to the present invention, the nucleophile-reactive reagent is added to the anionic reagent with effective agitation. The proportions of reagents are not critical but may be adjusted as needed to produce the desired block lengths in the product. In general, about 0.5-5 parts by weight of reagent A are used per part of reagent B. It is within the scope of the invention to conduct the reaction in a mold to produce a molded article.

Reaction temperatures are dictated partly by the identities of reagents A and B. For the reaction of a polycarbonate anion with a nucleophile-reactive siloxane, temperatures in the range of about 200°-350° C. and especially about 200°-300° C. are preferred. Anionic siloxanes generally react with cyclic polycarbonate oligomers at considerably lower temperatures, typically in the range of about 10°-75° C. and especially about 20°-40° C.

The method of this invention is illustrated by the following examples. All parts are by weight. Molecular weights were determined by gel permeation chromatography relative to polystyrene.

EXAMPLE 20

A mixture of one part of a cyclic bisphenol A polycarbonate oligomer mixture similar to that of Example 1, 0.003 part of lithium trifluoroethoxide and 13 parts of o-dichlorobenzene was heated for four hours under reflux, in a nitrogen atmosphere. A sample was removed and the polymer precipitated therefrom by pouring into methanol and filtering. It was found to be free of cyclics and to have a number average molecular weight of 8,060.

Octamethylcyclotetrasiloxane, 0.03 part, was added to the mixture and refluxing was continued for 19 hours. The block copolymer product was precipitated by pouring into methanol and filtered. It was shown by hydrogen and silicon-29 nuclear magnetic resonance to contain siloxane units and had a number average molecular weight of 12,910. Upon examination of the polymer with a refractive index detector, no peak attributable to a polysiloxane homopolymer was found. A film cast from the copolymer was cloudy and had a glass transition temperature of 135° C.

EXAMPLE 21

A mixture of 2 parts of the bisphenol A cyclic polycarbonate oligomer mixture of Example 20, 0.0083 part of lithium trifluoroethoxide and 12.5 parts of dichlorotoluene was heated at reflux for six hours under nitrogen. There was then added 606 mg. of a polydimethylsiloxane having an average degree of polymerization of 19 and containing chlorosilane end groups. Refluxing was continued for one hour, after which the polysiloxane-polycarbonate block copolymer was precipitated by pouring into acetone and filtered. The presence of siloxane units was confirmed by hydrogen and silicon-29 nuclear magnetic resonance.

EXAMPLE 22

A solution in 11 parts of chlorobenzene of one part of the cyclic bisphenol A polycarbonate oligomer mixture of Example 20 and 0.002 part of tetramethylammonium tetraphenylborate is heated under reflux in a nitrogen atmosphere for hour hours. There is then added 1 part of octamethylcyclotetrasiloxane, and refluxing is continued for about 10 hours. The desired polysiloxane-polycarbonate block copolymer is obtained by isolation as in Example 1.

EXAMPLE 23

A mixture of 3 parts of octamethylcyclotetrasiloxane, 1.51 parts of potassium trimethylsiloxanolate and 0.011 part of dimethyl sulfoxide was stirred in a nitrogen atmosphere for 18 hours. There were then added 3 parts of the cyclic bisphenol A polycarbonate oligomer mixture of Example 20 and 17.8 parts of dry tetrahydrofuran and stirring was continued for 4 hours. The polymeric product was precipitated by pouring the reaction mixture into methanol and was dissolved in methylene chloride and reprecipitated into acetone. It had weight and number average molecular weights of 65,738 and 36,783, respectively, and contained no cyclic carbonate oligomer species. It was shown by hydrogen nuclear magnetic resonance to comprise 72% siloxane and 28% carbonate units.

What is claimed is:

1. A method for preparing a siloxane-carbonate block copolymer which comprises reacting (A) at least one nucleophile-reactive siloxane compound with (B) at least one polycarbonate compound having the formula

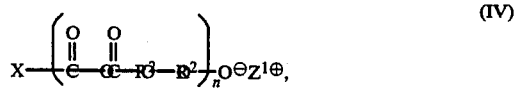

wherein X is a polycarbonate end group, $Z^1$ is one equivalent of a cation other than hydrogen, n is at least 1, at least about 60% of the total number of $R^2$ values are divalent aromatic radicals and the balance of said $R^2$ values are divalent aliphatic, alicyclic or aromatic radicals.

2. A method according to claim 1 wherein reagent A comprises at least one structural unit of the formula $$-\underset{\underset{R^1}{|}}{\overset{\overset{R^1}{|}}{Si}}-O-, \tag{I}$$

wherein each $R^1$ is independently a hydrocarbon or substituted hydrocarbon radical.

3. A method according to claim 2 wherein reagent A comprises a plurality of said structural units and all $R^1$ radicals are methyl or phenyl.

4. A method according to claim 3 wherein each $R^2$ radical has the formula $$-A^1-Y-A^2-, \tag{III}$$

wherein each of $A^1$ and $A^2$ is a single-ring divalent aromatic radical and Y is a bridging radical in which one or two atoms separate $A^1$ from $A^2$.

5. A method according to claim 4 wherein reagent B is prepared by contacting a cyclic polycarbonate oligomer composition with a polycarbonate formation catalyst.

6. A method according to claim 5 wherein each $R^1$ is methyl.

7. A method according to claim 6 wherein the polycarbonate formation catalyst has the formula $$M^\oplus {}^\ominus B(Z^2)_4, \tag{V}$$

wherein M is one equivalent of a cation other than hydrogen and $Z^2$ is phenyl.

8. A method according to claim 7 wherein M has the formula $$(R^3)_4 Q^\oplus, \tag{VI}$$

wherein each $R^3$ is independently a $C_{1-4}$ primary alkyl or $C_{6-10}$ aryl radical and Q is nitrogen, phosphorus or arsenic.

9. A method according to claim 6 wherein the reaction is conducted at a temperature in the range of about 200°–350° C.

10. A method according to claim 6 wherein reagent A is a linear polysiloxane containing chlorine atoms bound to silicon as end groups.

11. A method according to claim 6 wherein reagent A is a cyclic polysiloxane.

12. A method according to claim 11 wherein reagent A is octamethyltetrasiloxane.

13. A method according to claim 9 wherein each of $A^1$ and $A^2$ is p-phenylene, Y is isopropylidene and the polycarbonate formation catalyst is tetramethylammonium tetraphenylborate.

* * * * *